United States Patent
Himmelmann (10) Patent No.: US 9,567,166 B2
(45) Date of Patent: Feb. 14, 2017

(54) COMPACT CENTRIFUGAL AIR BLOWERS FOR AIR CUSHION SUPPORTED CARGO LOADING PLATFORM

(71) Applicant: Goodrich Corporation, Charlotte, NC (US)

(72) Inventor: Richard Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 288 days.

(21) Appl. No.: 14/512,127

(22) Filed: Oct. 10, 2014

(65) Prior Publication Data

US 2016/0101947 A1   Apr. 14, 2016

(51) Int. Cl.

| B65G 51/03 | (2006.01) |
| --- | --- |
| B64C 1/20 | (2006.01) |
| B64D 9/00 | (2006.01) |
| B64F 1/32 | (2006.01) |
| F04D 17/08 | (2006.01) |
| F04D 29/28 | (2006.01) |
| F04D 29/42 | (2006.01) |
| F04D 29/44 | (2006.01) |
| F04D 29/58 | (2006.01) |
| F04D 25/08 | (2006.01) |
| B65G 7/06 | (2006.01) |

(52) U.S. Cl.
CPC ............... *B65G 51/03* (2013.01); *B64C 1/20* (2013.01); *B64D 9/00* (2013.01); *B64F 1/32* (2013.01); *F04D 17/08* (2013.01); *F04D 25/082* (2013.01); *F04D 29/281* (2013.01); *F04D 29/4206* (2013.01); *F04D 29/4226* (2013.01); *F04D 29/441* (2013.01); *F04D 29/5853* (2013.01); *B64D 2009/006* (2013.01); *B65G 7/06* (2013.01)

(58) Field of Classification Search
CPC .. B65G 51/03; B65G 25/04; B65G 2814/0398; B65C 1/20; B65C 1/22; B64D 9/00; B64D 1/10; B64D 2009/006
USPC ..... 406/51, 73, 76, 88, 192, 198; 198/468.6, 198/468.9; 244/118.1, 137.1
See application file for complete search history.

(56) References Cited

U.S. PATENT DOCUMENTS

| 1,437,964 | A | | 12/1922 | Fitch | |
| --- | --- | --- | --- | --- | --- |
| 3,055,446 | A | | 9/1962 | Vaughen | |
| 3,081,886 | A | * | 3/1963 | Flexman | ................. B60V 3/04 104/134 |

(Continued)

FOREIGN PATENT DOCUMENTS

| AU | 442872 | 11/1973 |
| --- | --- | --- |
| BE | 723545 | 4/1969 |

(Continued)

OTHER PUBLICATIONS

Extended European Search Report dated Feb. 9, 2016 in European Application No. 15181603.0.

(Continued)

*Primary Examiner* — Joseph Dillon, Jr.
(74) *Attorney, Agent, or Firm* — Snell & Wilmer, L.L.P.

(57) ABSTRACT

The present disclosure includes cargo loading systems and components including cargo systems utilizing one or more air cushions to elevate one or more cargo shuttles. Air is delivered to the air cushions by compact centrifugal air blowers. Such compact centrifugal air blowers are designed to provide sufficient power to inflate air cushions, while having a sufficiently short profile.

11 Claims, 6 Drawing Sheets

(56) References Cited

U.S. PATENT DOCUMENTS

| | | | |
|---|---|---|---|
| 3,190,460 A | 6/1965 | Rubin | |
| 3,209,929 A | 10/1965 | Petersen et al. | |
| 3,513,934 A | 5/1970 | Crowley | |
| 3,561,623 A * | 2/1971 | McCaul | B64F 1/32 |
| | | | 198/350 |
| 3,597,117 A | 8/1971 | Zoehfeld | |
| 3,756,544 A | 9/1973 | Bader | |
| 3,773,391 A | 11/1973 | Crandall et al. | |
| 3,807,035 A | 4/1974 | Moorman | |
| 3,809,268 A | 5/1974 | Lutz | |
| 3,908,785 A | 9/1975 | Vaughen | |
| 3,986,605 A | 10/1976 | Dooley et al. | |
| 4,131,320 A | 12/1978 | Volat et al. | |
| 4,139,071 A | 2/1979 | Tackett | |
| 4,216,927 A | 8/1980 | Byrd | |
| 4,304,521 A * | 12/1981 | Hammond | B65G 1/08 |
| | | | 193/35 A |
| 4,353,457 A | 10/1982 | Haley | |
| 4,354,796 A | 10/1982 | Bergman | |
| 4,544,319 A | 10/1985 | Folling et al. | |
| 4,567,957 A | 2/1986 | Johnson | |
| 4,600,169 A | 7/1986 | Koster et al. | |
| 4,618,292 A | 10/1986 | Judge et al. | |
| 4,676,699 A | 6/1987 | Leonov | |
| 4,804,077 A * | 2/1989 | John, Jr. | G21C 21/02 |
| | | | 198/339.1 |
| 4,815,926 A | 3/1989 | Chaffee et al. | |
| 4,878,635 A | 11/1989 | Nordstrom | |
| 4,951,770 A | 8/1990 | Vaughen | |
| 4,984,756 A | 1/1991 | Anders | |
| 5,120,184 A * | 6/1992 | Gerawan | B60P 1/02 |
| | | | 187/276 |
| 5,137,367 A | 8/1992 | Madonia et al. | |
| 5,207,115 A | 5/1993 | Takei | |
| 5,226,773 A * | 7/1993 | Morito | B63B 25/002 |
| | | | 198/468.6 |
| 5,311,973 A | 5/1994 | Tseng et al. | |
| 5,350,270 A | 9/1994 | Stallard et al. | |
| 3,282,359 A | 11/1996 | Satterfield, Jr. | |
| 5,634,636 A | 6/1997 | Jackson et al. | |
| 5,690,567 A | 11/1997 | DeNijs et al. | |
| 5,850,906 A | 12/1998 | Dean | |
| 5,893,450 A | 4/1999 | Metivier | |
| 6,196,788 B1 | 3/2001 | Talbot et al. | |
| 6,427,947 B1 | 8/2002 | Rohrlick et al. | |
| 6,517,028 B2 | 2/2003 | Huber | |
| 6,630,633 B1 | 10/2003 | Uber et al. | |
| 6,640,963 B2 * | 11/2003 | Lecrivain | B65G 25/02 |
| | | | 198/463.3 |
| 7,073,994 B2 | 7/2006 | Huber et al. | |
| 7,108,474 B2 | 9/2006 | Moriya et al. | |
| 7,210,280 B2 * | 5/2007 | Cottone | B65G 67/20 |
| | | | 198/373 |
| 7,393,159 B2 | 7/2008 | Chang et al. | |
| 7,494,004 B2 | 2/2009 | Stolyar et al. | |
| 7,513,716 B2 | 4/2009 | Hayashi et al. | |
| 7,643,133 B2 * | 1/2010 | Milender | B65G 43/04 |
| | | | 244/137.1 |
| 7,695,235 B1 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 8,056,701 B2 * | 11/2011 | Sugimoto | B61B 13/127 |
| | | | 187/211 |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 * | 5/2016 | Himmelmann | B64D 9/00 |
| 9,387,931 B2 | 7/2016 | Himmelmann | |
| 2002/0164236 A1 * | 11/2002 | Fukuhara | B64F 1/3055 |
| | | | 414/373 |
| 2004/0241267 A1 | 12/2004 | Schultz | |
| 2004/0245397 A1 * | 12/2004 | Garcia | B65D 19/0002 |
| | | | 244/137.1 |
| 2007/0007391 A1 * | 1/2007 | McCoskey | B64C 25/405 |
| | | | 244/136 |
| 2007/0023259 A1 * | 2/2007 | Schonauer | B66F 9/147 |
| | | | 198/468.6 |
| 2007/0025832 A1 | 2/2007 | Rawdon et al. | |
| 2007/0125908 A1 * | 6/2007 | Eichholz | B64C 1/18 |
| | | | 244/118.1 |
| 2008/0011119 A1 | 1/2008 | Bartosch | |
| 2008/0257692 A1 | 10/2008 | Wallace | |
| 2009/0252568 A1 | 10/2009 | Morin | |
| 2010/0006401 A1 | 1/2010 | Flury et al. | |
| 2011/0215198 A1 | 9/2011 | Panzram et al. | |
| 2011/0240805 A1 | 10/2011 | Komiya | |
| 2011/0273313 A1 * | 11/2011 | Hettwer | B64D 9/00 |
| | | | 340/945 |
| 2012/0014757 A1 * | 1/2012 | Muller | B64D 11/02 |
| | | | 406/122 |
| 2012/0262849 A1 * | 10/2012 | Prax | F03D 9/007 |
| | | | 361/641 |
| 2013/0075065 A1 | 3/2013 | Degner et al. | |
| 2013/0287505 A1 * | 10/2013 | Seibt | B64D 11/02 |
| | | | 406/195 |
| 2013/0313073 A1 * | 11/2013 | Huber | B64D 9/00 |
| | | | 198/464.2 |
| 2014/0338557 A1 * | 11/2014 | Zhou | B61B 13/10 |
| | | | 104/138.1 |
| 2014/0367515 A1 * | 12/2014 | Lohmann | B60P 7/0892 |
| | | | 244/118.1 |
| 2014/0373747 A1 | 12/2014 | Yagci | |
| 2014/0377017 A1 * | 12/2014 | Panzram | B65G 51/03 |
| | | | 406/88 |
| 2015/0225082 A1 | 8/2015 | Levron | |
| 2015/0298808 A1 * | 10/2015 | Huber | G01C 21/00 |
| | | | 701/25 |
| 2016/0052630 A1 | 2/2016 | Himmelmann | |
| 2016/0101857 A1 | 4/2016 | Himmelmann et al. | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |
| 2016/0101862 A1 | 4/2016 | Himmelmann | |
| 2016/0101863 A1 | 4/2016 | Himmelmann | |
| 2016/0194081 A1 | 7/2016 | Himmelmann | |
| 2016/0194083 A1 * | 7/2016 | Himmelmann | B64C 1/20 |
| | | | 244/118.1 |
| 2016/0221763 A1 * | 8/2016 | Himmelmann | B64C 1/20 |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 0377692 | 7/1990 |
| EP | 1547893 | 6/2005 |
| EP | 2815970 | 12/2014 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

(56) References Cited

FOREIGN PATENT DOCUMENTS

OTHER PUBLICATIONS

Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Notice of Allowance dated Mar. 24, 2016 in U.S. Appl. No. 14/512,113.
Supplemental Notice of Allowability dated Jun. 3, 2016 in U.S. Appl. No. 14/512,113.
Extended European Search Report dated Jun. 22, 2016 in European Application No. 16153483.9.
Preinterview First Office Action dated Jun. 30, 2016 in U.S. Appl. No. 14/512,056.
Extended European Search Report dated Jul. 11, 2016 in European Application No. 16150150.7.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability Jan. 7, 2016 in U.S. Appl. No. 14/464,323.
Preinterview First Office Action dated Jan. 7, 2016 in U.S. Appl. No. 14/512,113.
Notice of Allowance dated Jan. 20, 2016 in U.S. Appl. No. 14/511,553.
Partial European Search Report dated Mar. 18, 2016 in European Application No. 15189110.8.
Notice of Allowance dated Apr. 1, 2016 in U.S. Appl. No. 14/511,645.
Final Office Action dated Apr. 22, 2016 in U.S. Appl. No. 14/511,559.
Supplemental Notice of Allowability dated May 3, 2016 in U.S. Appl. No. 14/512,113.
Preinterview First Office Action dated Sep. 4, 2015 in U.S. Appl. No. 14/512,000.
Notice of Allowance dated Oct. 19, 2015 in U.S. Appl. No. 14/512,000.
Preinterview First Office Action dated Sep. 8, 2016 in U.S. Appl. No. 14/512,056.
Notice of Allowance dated Oct. 11, 2016 in U.S. Appl. No. 14/512,066.
Corrected Notice of Allowability dated Oct. 27, 2016 in U.S. Appl. No. 14/512,118.
Notice of Allowance dated Oct. 7, 2016 in U.S. Appl. No. 14/512,118.
Notice of Allowance dated Oct. 11, 2016 in U.S. Appl. No. 14/512,011.
Corrected Notice of Allowability dated Nov. 1, 2016 in U.S. Appl. No. 14/512,011.
Preinterview First Office Action dated Oct. 25, 2016 in U.S. Appl. No. 14/610,391.
Office Action dated Oct. 26, 2016 in U.S. Appl. No. 14/511,559.

\* cited by examiner

COMPACT CENTRIFUGAL AIR BLOWERS FOR AIR CUSHION SUPPORTED CARGO LOADING PLATFORM

FIELD

The present disclosure relates generally to cargo loading systems and, more specifically, to cargo loading systems utilizing compact centrifugal air blowers.

BACKGROUND

Conventional aircraft cargo systems typically include various tracks and rollers that span the length of an aircraft. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

A cargo loading system in accordance with the present disclosure may comprise a cargo shuttle having a frame, an air cushion located beneath the cargo shuttle, a compact centrifugal air blower positioned within the frame of the cargo shuttle and comprising an outlet in fluid communication with the air cushion, a stator integrated into a first heat diffuser, and a magnet concentrically surrounding the stator. The compact centrifugal air blower may include impeller concentrically surrounding the stator and physically coupled to the magnet. The outlet and/or inlet may be perpendicular to the stator. The compact centrifugal air blower may pump air into the air cushion at a rate between about 6 kPa and about 70 kPa. The height of the compact centrifugal air blower may be between about 25 mm and about 50 mm. The impeller may be concentrically surrounded by a second heat diffuser.

A compact centrifugal air blower in accordance with the present disclosure may comprise an outlet in fluid communication with an air cushion, a stator integrated into a first heat diffuser, an impeller concentrically surrounding the stator, wherein a magnet is physically coupled to the impeller, and a second heat diffuser concentrically surrounding the impeller. The outlet may be perpendicular to the stator. The blower may include an inlet perpendicular to the stator. Further, the compact centrifugal air blower may pump air into the air cushion at a rate between about 6 kPa and about 70 kPa and a height of the compact centrifugal air blower is between about 25 mm and about 50 mm.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Cargo loading systems of the present disclosure comprise one or more compact centrifugal air blowers which provide air to air cushions to elevate one or more cargo shuttles. The compact nature of the air blowers allows for improved fitment within an aircraft cargo area.

Figure 1:
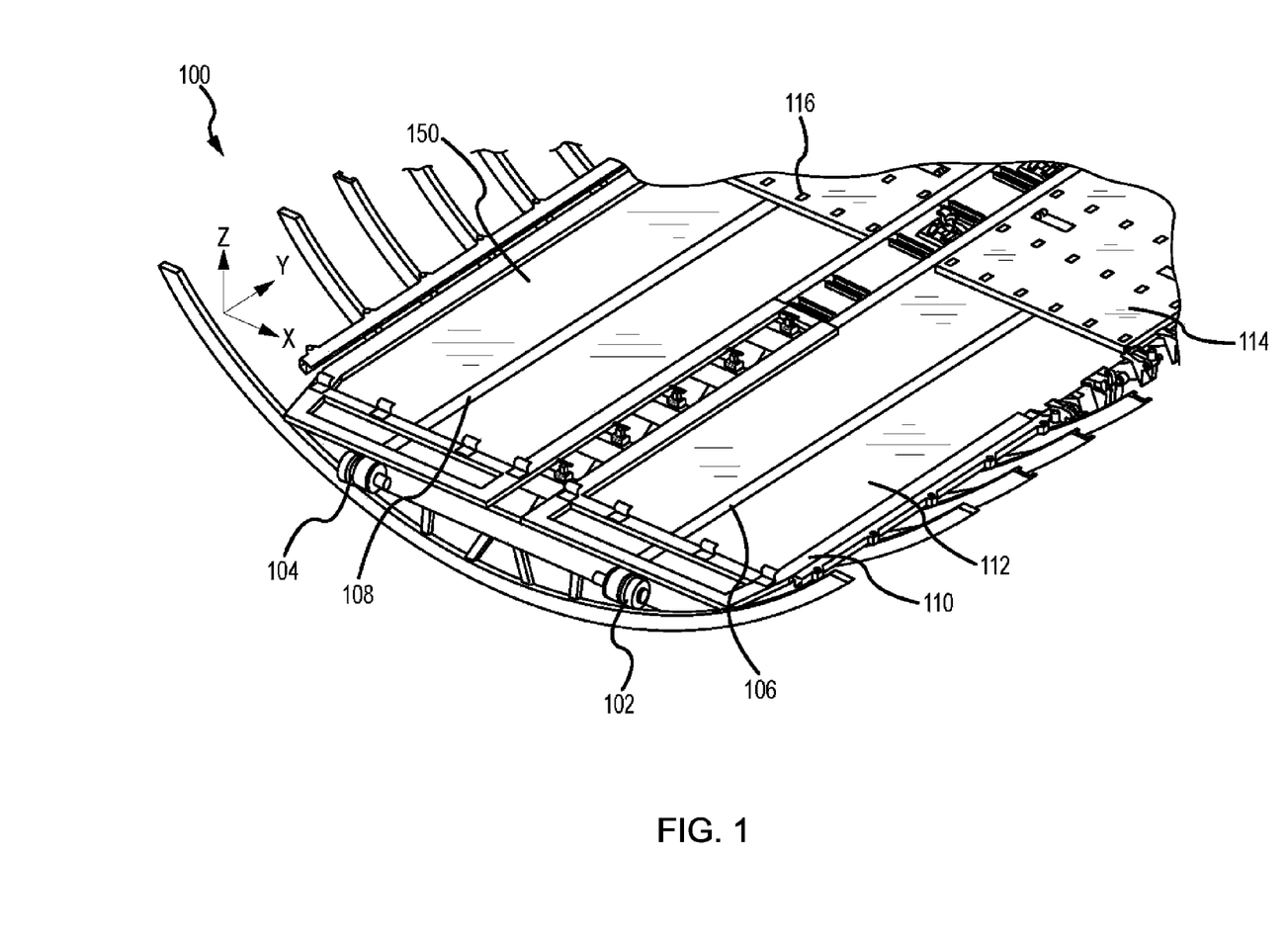
FIG. 1 illustrates a portion of a cargo management system, in accordance with the present disclosure.
Figure 2:
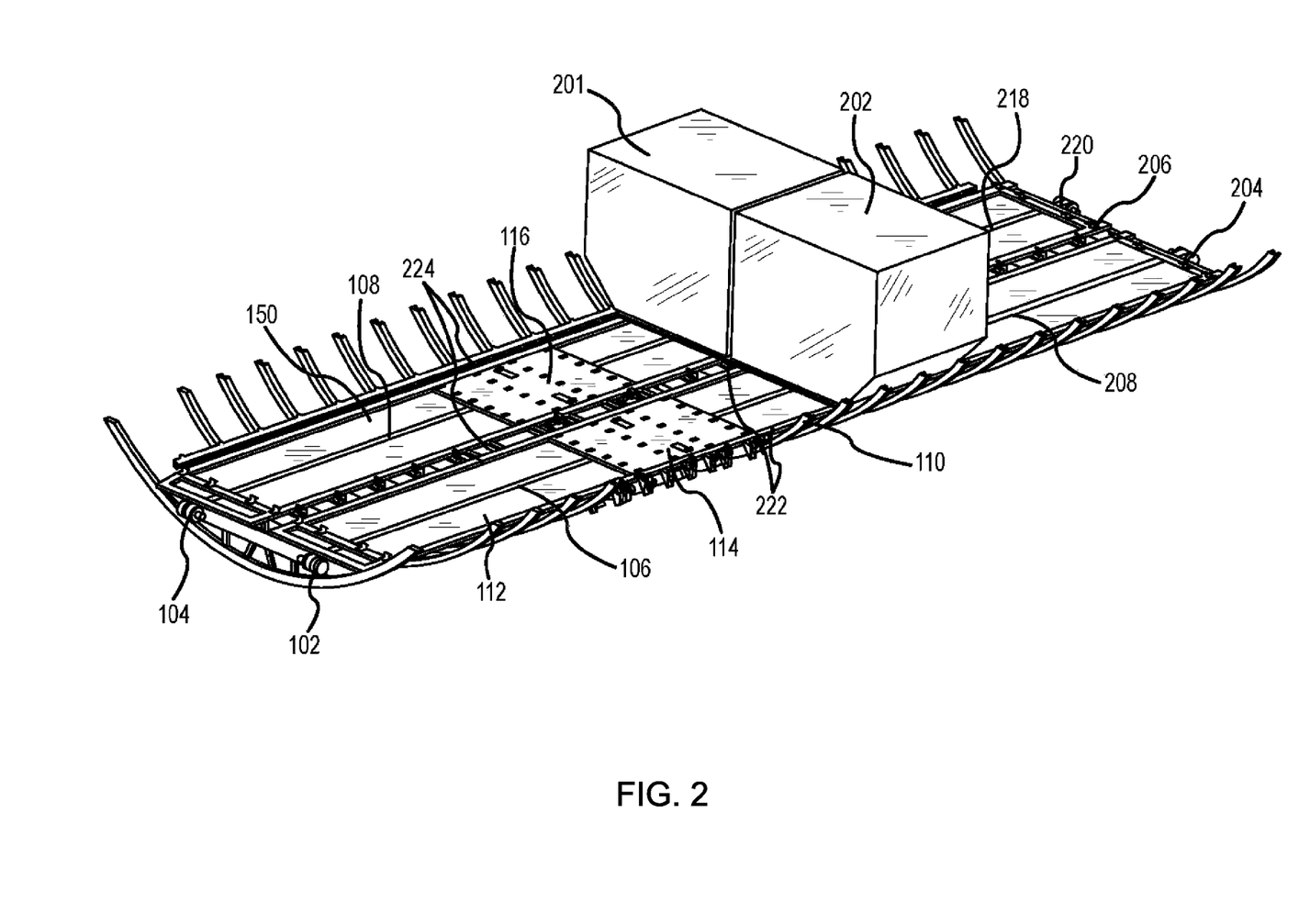
FIG. 2 illustrates a portion of a cargo management system, in accordance with the present disclosure.

With reference to FIGS. 1 and 2, an aircraft cargo management system 100 in accordance with the present disclosure is illustrated using an x, y, and z axes for ease of illustration. Air cushion cargo shuttle 114 and 116 are shown forward of an aft portion of an aircraft. In various embodiments, air cushion cargo shuttle 114 may be coupled to an aft drive shuttle belt 106 and air cushion cargo shuttle 116 may be coupled to an aft drive shuttle belt 108. Aft drive shuttle belt 106 is coupled to an aft drive shuttle unit 102, and aft drive shuttle belt 108 is coupled to an aft drive shuttle unit 104.

In various embodiments, a floor panel 112 is positioned beneath air cushion cargo shuttle 114. Similarly, a floor panel 150 may be positioned beneath air cushion cargo shuttle 116. As used with respect to air cushion cargo shuttle 114 and 116, the term "beneath" may refer to the negative z direction. As used with respect to air cushion cargo shuttle 114 and 116, the term "above" may refer to the positive z direction. In various embodiments, support rails 222 and 224 are laterally adjacent to floor panels 112 and 150, and may be mounted to another aircraft component, such as an airframe, and may be capable of supporting the weight of cargo. Floor panel 112 may comprise at least one of a composite material or a metallic material.

Air cushion cargo shuttle 114 may, for example, be coupled to forward drive shuttle belt 208 and air cushion cargo shuttle 116 is coupled to forward drive shuttle belt 218. Forward drive shuttle belt 208 is coupled to forward shuttle drive unit 204. Forward drive shuttle belt 218 is coupled to forward shuttle drive unit 220. Cargo 202 is shown as resting on support rails 222 and cargo 201 is shown as resting on support rails 224. In various embodiments, cargo shuttle 116 may be used to lift cargo 201 off support rails 224 in the positive z direction and move cargo 201 forward or aft.

Forward drive shuttle belt 208, forward drive shuttle belt 218, aft drive shuttle belt 106, and aft drive shuttle belt 108 (collectively, a "shuttle belt") may comprise any suitable belt capable of pulling an air cushion cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 204, forward shuttle drive unit 220, aft drive shuttle unit 102 and aft drive shuttle unit 104 (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction.

Figure 3:
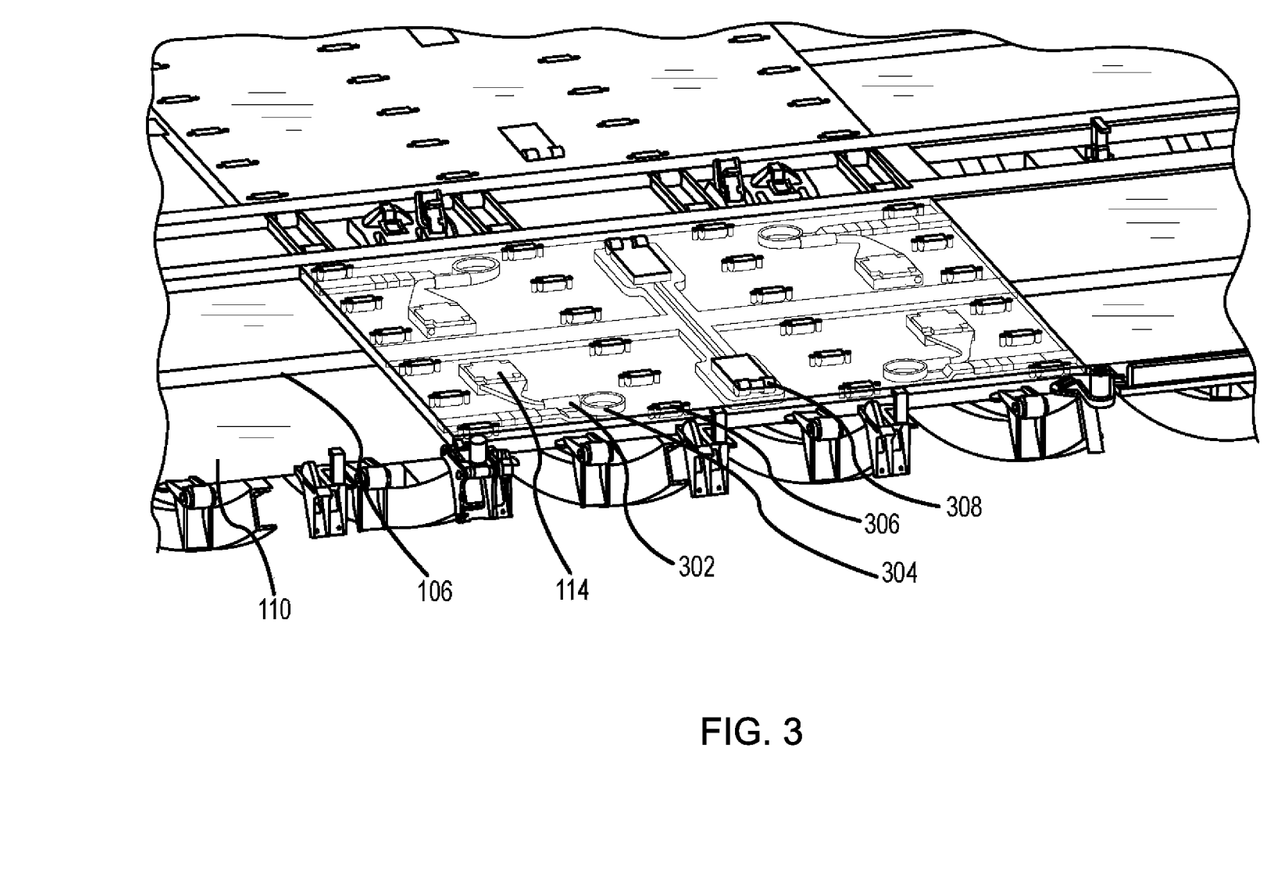
FIG. 3 illustrates a portion of a cargo management system, in accordance with the present disclosure.
Figure 4:
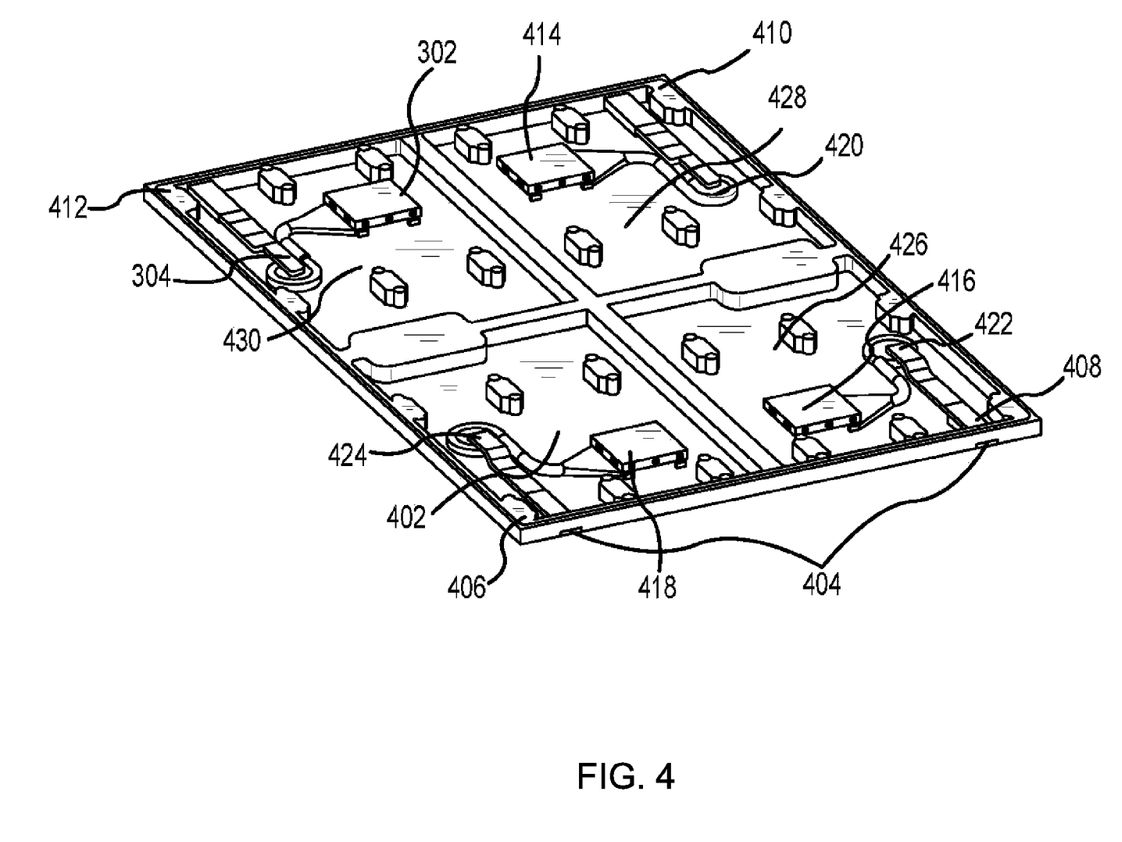
FIG. 4 illustrates a portion of a cargo management system, in accordance with the present disclosure.

With reference to FIGS. 3 and 4, air cushion cargo shuttle 114 may further comprise an air cushion 330 positioned beneath air cushion cargo shuttle 114. It should be understood that air cushion cargo shuttle 116 is similarly structured and thus the features discussed herein relative to air cushion cargo shuttle 114 are also applicable to air cushion cargo shuttle 116. Air cushion 330 is in fluid communication with an outlet of a centrifugal air blower 304. In that regard, centrifugal air blower 304 may blow air beneath air cushion cargo shuttle 114 and, more specifically, into volume 302. Volume 302 is shown in proximity to floor panel 112.

Centrifugal air blower 304 is shown located beneath air cushion cargo shuttle 114. Air cushion cargo shuttle 114 may comprise one or more centrifugal air blowers. In various embodiments, centrifugal air blower 304 is a compact air blower designed to fit entirely and/or at least partially beneath air cushion cargo shuttle 114 and within air cushion 330. For example, centrifugal air blower 304 may comprise a height 520 (with momentary reference to FIG. 5B) that is equal to or less than the height (measured along the z axis) of air cushion 330. For example, the height along the z axis of the air cushion 330 may be about 2 inches. In such embodiments, height 520 of air cushion cargo shuttle 114 may be less than about 2 inches. In various embodiments, height 520 of air blower 304 may be between 1 inch (25 mm) to 5 inches (125 mm), 1.5 inch (37 mm) and 3 inches (75 mm), and about 2 inches (50 mm), where the term about in this context may refer to +/−0.5 inch (12 mm).

Figure 5A:
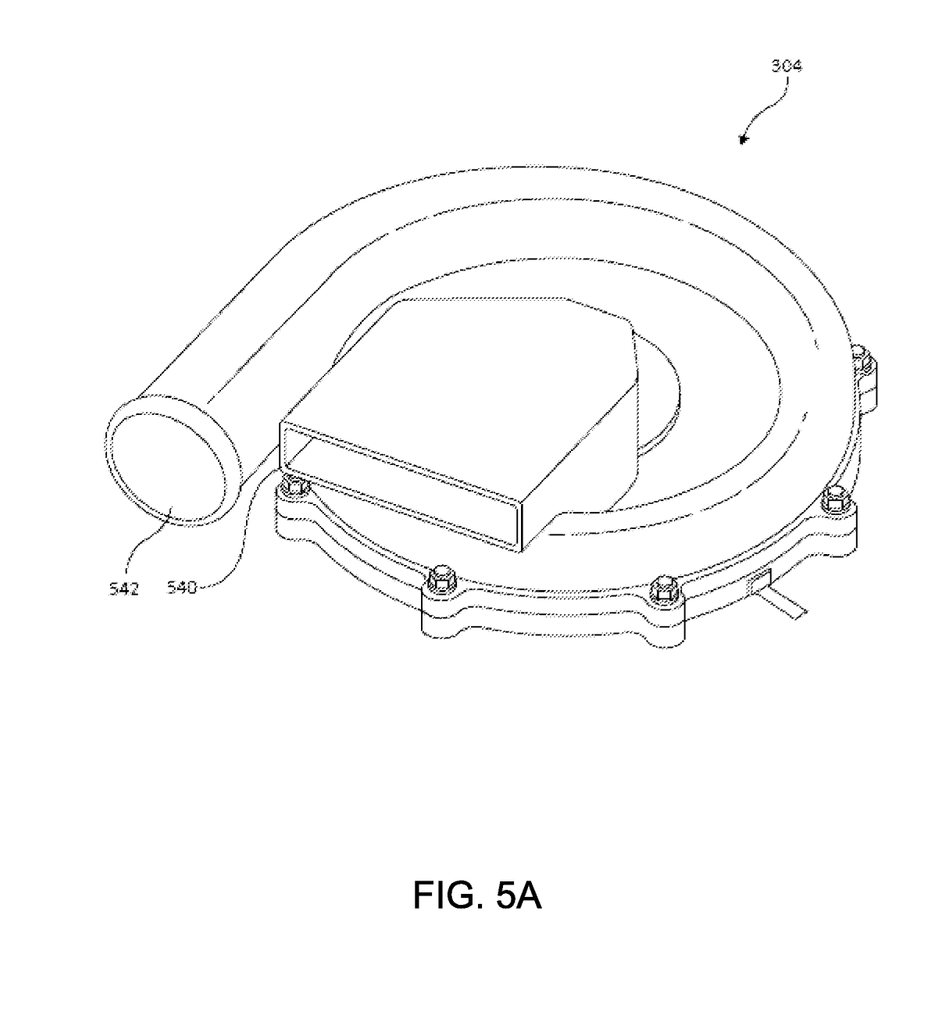
FIGS. 5A and 5B illustrate, respectively, a perspective view and a cross-sectional view of a compact centrifugal blower, in accordance with the present disclosure.
Figure 5B:
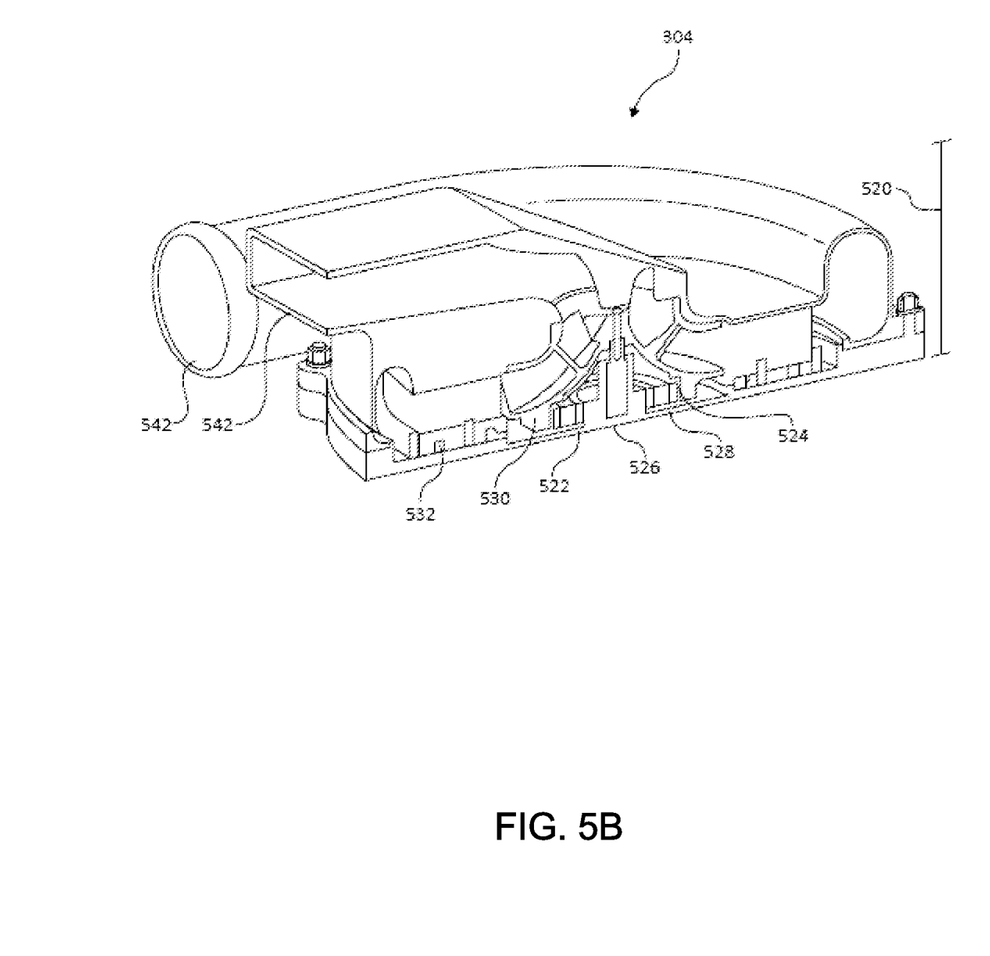

In various embodiments, compact centrifugal air blower 304 comprises a permanent magnet motor. For example, with reference to FIG. 5, blower 304 may comprise a direct-current brushless motor having a stator 522 surrounded by a magnet 524. Stator 522 may be physically coupled to a heat diffuser, such as first heat diffuser 526. In various embodiments, stator 522 is press fit into a cavity 528 of first heat diffuser 526.

Blower 304 may further comprise an impeller 530. In various embodiments, magnet 524 is physically coupled to impeller 530, and magnet 524 and impeller 530 concentrically surround stator 522. For example, magnet 524 may be a cup style magnet integrated into impeller 530. Impeller 530 and magnet 524 may rotate around stator 522, pumping air out compact centrifugal air blower 304. Impeller 530 may comprise, for example, a heat conducting metallic material such as aluminum. In such embodiments, impeller 530 may act to cool magnet 524 during operation of blower 304.

In various embodiments, blower 304 may comprise a second heat diffuser 532 which concentrically surrounds impeller 530. Second heat diffuser 532 may act to cool stator 522 during operation of blower 304. In various embodiments, second heat diffuser 532 acts to diffuse the high velocity air leaving impeller 530, converting it to a lower velocity, higher pressure air. Second heat diffuser 532 may be coupled to stator 522 via, for example, press fitting into cavity 528. The heat generated in stator 522 may be conducted through cavity 528 and into second heat diffuser 532. In various embodiments, second heat diffuser 532 may be a vaned centrifugal compressor diffuser.

Blower 304 may further comprise an inlet 540 which provides air to blower 304. In various embodiments, inlet 540 draws air from outside of air cushion 330 in to blower 304. Inlet 540 may, for example, be oriented perpendicularly to stator 522.

In various embodiments, blower 304 may comprise an outlet 542. Outlet 542 is in fluid communication with and provide pressurized air to air cushion 330. Similar to inlet 540, outlet 542 may be oriented perpendicularly to stator 522. In various embodiments, inlet 540 comprises a constant velocity configuration that reduces turbulence in the incoming air. Although described in connection with a single blower 304, system 100 may comprise multiple blowers, and each blower may comprise one associated inlet, though in various embodiments one blower is associated with multiple inlets. In further embodiments, a single inlet may supply air to one or more compact centrifugal air blowers.

In various embodiments, impeller 530 forces air across second heat diffuser 532 and out of inlet 540. Such configurations may provide improved cooling of stator 522 by providing air flow across and through second heat diffuser 532.

Centrifugal air blower 304 is controlled by centrifugal air blower controller 302. Air cushion cargo shuttle 114 may comprise one or more centrifugal air blower controllers. In various embodiments, each centrifugal air blower has one associated centrifugal air blower controller, though in various embodiments one centrifugal air blower controller controls multiple centrifugal air blowers. Centrifugal air blower controller 302 may provide power and instructions to centrifugal air blower 304 to control how and when centrifugal air blower 304 operates.

As shown, air cushion cargo shuttle 114 has four centrifugal air blower controllers 302, 414, 416, and 418 driving four centrifugal air blowers 304, 420, 422, and 424 to blow air into four different volumes 402, 426, 428, and 430. Each centrifugal air blower controller may further comprise a proximity sensor that may be configured to measure the proximity of a portion of air cushion cargo shuttle 114 to floor panel 112. For example, proximity sensors 406, 408, 410 and 412 may be associated with each centrifugal air blower controller 302, 414, 416, and 418. Proximity sensors 406, 408, 410 and 412 may be used in a closed loop control mechanism to modulate the output of four centrifugal air blowers 304, 420, 422, and 424. In that regard, centrifugal air blower controllers 302, 414, 416, and 418 may command four centrifugal air blowers 304, 420, 422 to blow air into volumes 402, 426, 428, and 430 until the proximity sensors 606, 608, 610 and 612 indicate that a desired proximity has been reached.

Moreover, data from proximity sensors 406, 408, 410 and 412 may be used to detect and compensate for uneven cargo loads. For example, in the event cargo 202 shifts to one portion of air cushion cargo shuttle 114 or otherwise exerts more force on a portion of air cushion cargo shuttle 114 relative to another, data from proximity sensors 406, 408, 410 and 412 may detect that one portion of air cushion cargo shuttle 114 is not as far from floor panel 112 as one or more other portions of air cushion cargo shuttle 114. In that regard, where insufficient distance from floor panel 112 is achieved, a centrifugal air blower controller may command its associated centrifugal air blower to increase output to compensate for the uneven load.

In that regard, in operation, cargo such as cargo 202 may be loaded onto air cushion cargo shuttle 114 at an aft position, such as a position proximate aft drive shuttle unit 102. Cargo 202 may be positioned onto air cushion cargo shuttle 114 using power drive unit 308 and roller 306. During loading of cargo 202, air cushion cargo shuttle 114 may be in contact with floor panel 112. Once cargo 202 is suitably positioned on top of air cushion cargo shuttle 114 (where the phrase "on top" in this context may refer to distance across the positive z direction), a control system for centrifugal air blower controller 302 may instruct centrifugal air blower 304 to begin operation. In this manner, air from inlets 540 is pulled into centrifugal air blower 304 and centrifugal air blower 304 blows this air into volume 402. As more air is blown into volume 402, the increased air pressure may act to lift air cushion cargo shuttle 114 apart from floor panel 112. In this context, the phrase "lift apart" may refer to movement of air cushion cargo shuttle 114 in the positive z direction. In various embodiments, the pressure in volume 402 may reach between 1 psi (6.89 kPa) to 10 psi (68.9 kPa), between 2 psi (13.7 kPa) and 6 psi (41.3 kPa), and about 4 psi (27.5 kPa), where the term about in this context may refer to +/−0.5 psi (3.4 kPa).

A control system comprising, for example, a processor and a tangible, non-transitory memory may be configured to be in electrical and/or logical communication with centrifugal air blower controller 302. For example, the control system may communicate with centrifugal air blower controller 302 via one or more shuttle belts. The control system may instruct the centrifugal air blower controller 302 to start, stop, and modulate the output of centrifugal air blower 304.

During operation of centrifugal air blower 304, cargo 202 may lift apart from floor panel 112, thus reducing the friction between air cushion cargo shuttle 114 and the floor panel 112. Stated another way, dry friction may be equal to the coefficient of friction multiplied by the normal force. By eliminating the contact between air cushion cargo shuttle 114 and the floor panel 112, the two surfaces do not interact to cause friction. In various embodiments, there may be contact between air cushion cargo shuttle 114 and the floor panel 112 during operation of centrifugal air blower 304, though the air pressure will oppose the normal force (i.e., force in the negative z direction) exerted by cargo 202 and thus friction will be reduced because of this reduction in the normal force.

While cargo 202 is lifted apart from floor panel 112, the forward shuttle drive unit 204 may rotate its bobbin, causing forward drive shuttle belt 208 to pull air cushion cargo shuttle 114 and cargo 202 forward. Aft drive shuttle unit 104 may be allowed to exert a low level drag force on shuttle drive belt 108, thus allowing aft drive shuttle belt 108 to extend in a forward direction. A low level drag force exerted by aft drive shuttle unit 104 may prevent excessive cargo velocity and may maintain stability in the event an aircraft is not precisely level. Once cargo 202 is positioned in the aircraft at a desired position, the control system may instruct the centrifugal air blower controller 302 to turn off or lower the output of centrifugal air blower 304. In that regard, due to loss of air pressure in volume 402, air cushion cargo shuttle 114 may move in a negative z direction and contact floor panel 112. As air cushion cargo shuttle 114 moves towards floor panel 112, cargo 202 may come to rest on support rails 222. Thus, the air cushion cargo shuttle 114 may separate from the cargo 202 as the cargo 202 is restrained from motion in the negative z direction by support rails 222. In this manner, air cushion cargo shuttle 114 may be brought aft to load additional cargo. The aft drive shuttle unit 102 may rotate its bobbin, causing aft drive shuttle belt 108 to pull air cushion cargo shuttle 114 aft. Additional cargo may now be loaded and the process may proceed again.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo loading system, for an elongated cargo storage area having a longitudinal axis, comprising:
   a cargo shuttle having a frame;
   a translation means to at least one of advance or retract the shuttle along the axis;
   an air volume located beneath the cargo shuttle; and
   a compact centrifugal air blower positioned within the frame of the cargo shuttle and comprising an outlet in fluid communication with the air volume to displace a top surface orthogonal to the axis, a stator integrated into a first heat diffuser, and a magnet concentrically surrounding the stator.

2. The cargo loading system of claim 1, wherein the compact centrifugal air blower further comprises an impeller concentrically surrounding the stator and physically coupled to the magnet.

3. The cargo loading system of claim 1, wherein the outlet is perpendicular to the stator.

4. The cargo loading system of claim 1, wherein the compact centrifugal air blower further comprises an inlet.

5. The cargo loading system of claim 4, wherein the inlet is perpendicular to the stator.

6. The cargo loading system of claim 4, wherein the inlet is in fluid communication with the air volume.

7. The cargo loading system of claim 1, wherein the compact centrifugal air blower pumps air into the air volume at a rate between about 6 kPa and about 70 kPa.

8. The cargo loading system of claim 1, wherein a height of the compact centrifugal air blower is between about 25 mm and about 50 mm.

9. The cargo loading system of claim 2, wherein the impeller is concentrically surrounded by a second heat diffuser.

10. The cargo loading system of claim 9, wherein the second heat diffuser is aluminum.

11. The cargo loading system of claim 1, wherein the first heat diffuser is aluminum.

\* \* \* \* \*